United States Patent
Wu

(10) Patent No.: US 9,717,013 B2
(45) Date of Patent: Jul. 25, 2017

(54) DEVICE AND METHOD OF HANDLING MEASUREMENT CONFIGURATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 87 days.

(21) Appl. No.: 14/732,805

(22) Filed: Jun. 8, 2015

(65) Prior Publication Data

US 2015/0358846 A1    Dec. 10, 2015

Related U.S. Application Data

(60) Provisional application No. 62/009,891, filed on Jun. 9, 2014.

(51) Int. Cl.
| | |
|---|---|
| *H04L 1/00* | (2006.01) |
| *H04W 24/10* | (2009.01) |
| *H04W 24/08* | (2009.01) |
| *H04W 36/00* | (2009.01) |
| *H04W 76/02* | (2009.01) |

(52) U.S. Cl.
CPC .......... *H04W 24/10* (2013.01); *H04W 24/08* (2013.01); *H04W 36/0094* (2013.01); *H04W 36/0055* (2013.01); *H04W 76/028* (2013.01)

(58) Field of Classification Search
CPC ..... H04W 24/10; H04W 24/08; H04W 88/08; H04L 12/413
USPC .......................... 370/252, 338, 347, 477, 463
See application file for complete search history.

(56) References Cited

U.S. PATENT DOCUMENTS

| | | | | |
|---|---|---|---|---|
| 5,966,375 A | * | 10/1999 | Kagaya | H04W 74/0875 370/338 |
| 2010/0323720 A1 | * | 12/2010 | Jen | H04B 7/2606 455/456.1 |

FOREIGN PATENT DOCUMENTS

WO    2013133630 A1    9/2013

OTHER PUBLICATIONS

European Search report issued on Oct. 8, 2015 for EP application No. 15171176.9.
Nokia Siemens Networks, Nokia Corporation, "Background inter-frequency measurement for small cell discovery", 3GPP TSG-RAN WG2 Meeting#81bis, R2-131249, Apr. 15-19, 2013, Chicago, USA, XP050699304, pp. 1-11.

(Continued)

*Primary Examiner* — Chi H Pham
*Assistant Examiner* — Alexander O Boakye
(74) *Attorney, Agent, or Firm* — Winston Hsu

(57) ABSTRACT

A communication device for handling a measurement configuration comprises a storage unit for storing instructions and a processing means coupled to the storage unit. The instructions comprise receiving a measurement configuration comprising a first carrier frequency and a low priority for the first carrier frequency from a network; changing the low priority of the first carrier frequency to a normal priority in response to a radio resource control (RRC) procedure; and performing a measurement on the first carrier frequency according to the measurement configuration comprising the first carrier frequency with the normal priority. The processing means is configured to execute the instructions stored in the storage unit.

14 Claims, 4 Drawing Sheets

(56) References Cited

OTHER PUBLICATIONS

3GPP TS 36.331 V12.1.0 (Mar. 2014), "3rd Generation Partnership Project; Technical Specification Group Radio Access Network; Evolved Universal Terrestrial Radio Access (E-UTRA); Radio Resource Control (RRC); Protocol specification (Release 12)", XP050769960, pp. 1-356.
3GPP TS 36.331 V12.1.0 (Mar. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12).
3GPP TSG-RAN WG2 Meeting #86 R2-142674 Seoul, South Korea, May 19-May 23, 2014 CR-Form-v11 Change Request 36.331 CR CRNum rev—Current version: 12.1.0.
3GPP TSG-RAN WG2 Meeting #86 R2-142943 Seoul, South Korea, May 19-May 23, 2014 CR-Form-v11 Change Request 36.331 CR 1499 rev 1 Current version: 12.1.0.
3GPP TS 36.300 V12.1.0 (Mar. 2014) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

\* cited by examiner

DEVICE AND METHOD OF HANDLING MEASUREMENT CONFIGURATION

CROSS REFERENCE TO RELATED APPLICATIONS

This application claims the benefit of U.S. Provisional Application No. 62/009,891, filed on Jun. 9, 2014 and incorporated herein by reference.

BACKGROUND OF THE INVENTION

1. Field of the Invention

The present invention is related to a communication device and a method used in a wireless communication system, and more particularly, to a communication device and a method of handling a measurement configuration in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs) and for communicating with a core network including a mobility management entity (MME) a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, uplink multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

As defined in a legacy 3GPP standard (e.g., 3GPP 36.331 v12.1.0), a maximum number of measurement identities (measId) in the measurement configuration is 32. The maximum number of measurement identities (measId) is going to be changed to 64 according to recent developments in 3GPP RAN2 and 3GPP RAN4. Thus, a UE may be configured a measurement configuration including a measId greater than 32 by a source eNB. The source eNB transmits the measurement configuration to a target eNB to prepare a handover, when the source eNB initiates the handover to a target eNB for the UE. However, the target eNB may not support the measId greater than 32. In one example, the UE may transmit a measurement report including the measId greater than 32 to the target eNB, after the UE performs a radio resource control (RRC) connection re-establishment with the target eNB. The target eNB cannot process the measurement report, because the target eNB cannot recognize the measId. The target eNB cannot even release the measurement configuration, because the measurement configuration is indicated by the measId greater than 32.

Furthermore, the target eNB may not support a new sub-configuration such as widebandRSRQ-Meas-r11, t312, alternativeTimetoTrigger or a measurement priority of a carrier frequency. The target eNB is not able to release the new sub-configuration which was configured by the source eNB to the UE.

Thus, how to handle the measurement configuration is an important topic to be discussed.

SUMMARY OF THE INVENTION

The present invention therefore provides a communication device and a method for handling a measurement configuration to solve the abovementioned problem.

A communication device for handling a measurement configuration comprises a storage unit for storing instructions and a processing means coupled to the storage unit. The instructions comprise receiving a measurement configuration comprising a first carrier frequency and a low priority from a network for the first carrier frequency; changing the low priority of the first carrier frequency to a normal priority in response to a radio resource control (RRC) procedure; and performing a measurement on the first carrier frequency according to the measurement configuration comprising the first carrier frequency with the normal priority. The processing means is configured to execute the instructions stored in the storage unit.

A communication device for handling a measurement configuration comprises a storage unit for storing instructions and a processing means coupled to the storage unit. The instructions comprise releasing at least one sub-configuration of a first measurement configuration in response to a radio resource control (RRC) procedure; and processing a measurement according to the first measurement configuration. The processing means is configured to execute the instructions stored in the storage unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
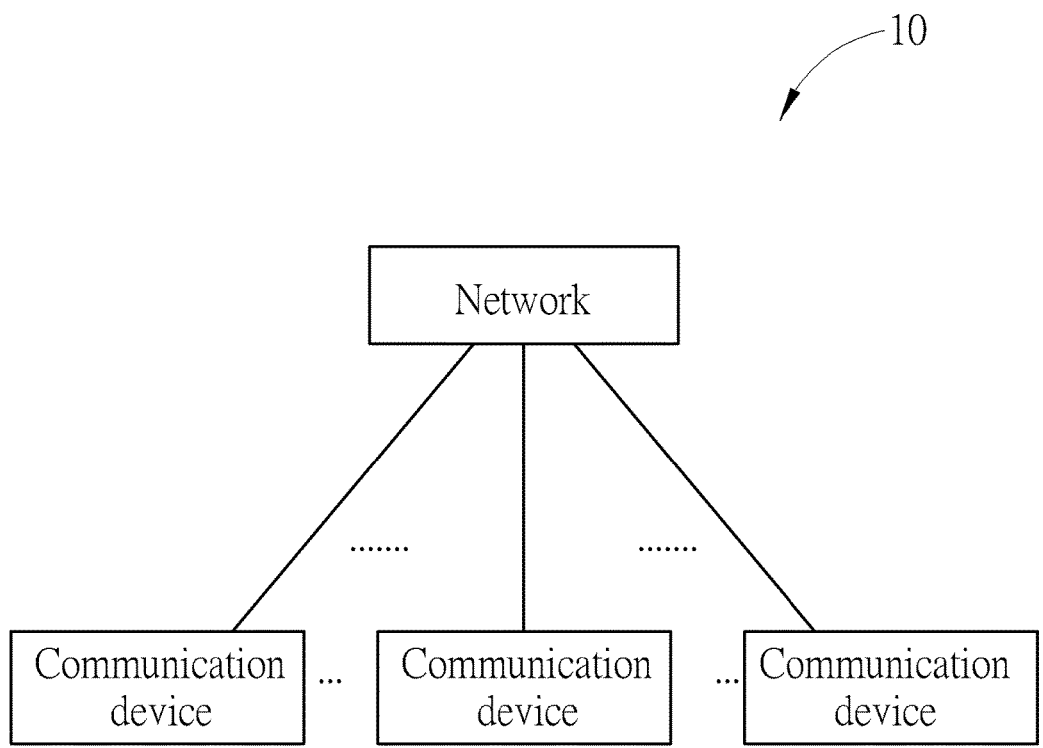
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode or a TDD-FDD joint operation mode. That is, the network and a communication device may communicate with each other via FDD carrier(s) and/or TDD carrier(s). In addition, the wireless communication system 10 may support a carrier aggregation (CA). That is, the network and a communication device may communicate with each other via multiple cells (e.g., multiple carriers) including a primary cell (e.g., primary component carrier (PCC)) and one or more secondary cells (e.g., secondary component carriers (SCCs)). The abovementioned cells may be operated in the same or different duplexing modes. For example, each cell may be a FDD cell (or TDD cell), when the cells are operated in the same duplexing mode. There are also several scenarios, when the cells are operated in different duplexing modes (e.g. TDD-FDD joint operation). For example, the primary cell may be operated on a TDD carrier, while a secondary cell may be operated on a FDD carrier. In another example, the primary cell may be operated on the FDD carrier, while the secondary cell may be operated on the TDD carrier. For the CA conforming to the 3rd Generation Partnership Project (3GPP) long-term evolution (LTE) Rel-10/11/12, 5 cells (e.g., serving cells) may be supported by the communication device and the network.

In FIG. 1, the network and the communication devices are simply utilized for illustrating the structure of the wireless communication system 10. Practically, the network may be a universal terrestrial radio access network (UTRAN) comprising at least one Node-Bs (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
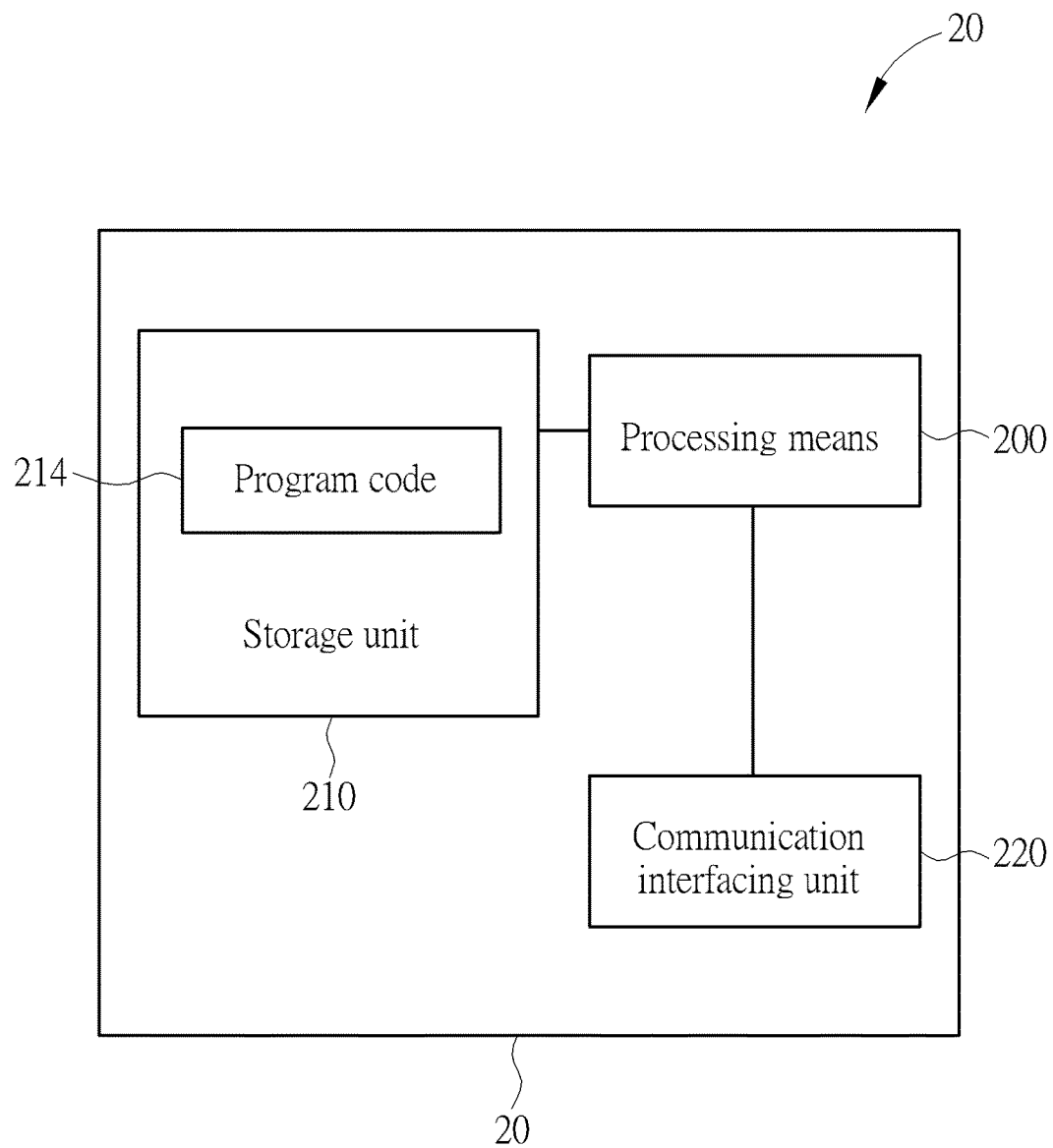
FIG. 2 is a schematic diagram of a communication device according to an example of the present invention.

FIG. 2 is a schematic diagram of a communication device 20 according to an example of the present invention. The communication device 20 may be used for realizing a communication device and/or the network shown in FIG. 1, but is not limited herein. The communication device 20 may include a processing means 200 such as a microprocessor or Application Specific Integrated Circuit (ASIC) a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM) read-only memory (ROM) flash memory, random-access memory (RAM) Compact Disc Read-Only Memory (CD-ROM) digital versatile disc-ROM (DVD-ROM) Blu-ray Disc-ROM (BD-ROM) magnetic tape, hard disk, optical data storage device, non-volatile storage unit, non-transitory computer-readable medium (e.g., tangible media) etc. The communication interfacing unit 220 is preferably a transceiver and is used to transmit and receive signals (e.g., data, messages and/or packets) according to processing results of the processing means 200.

Figure 3:
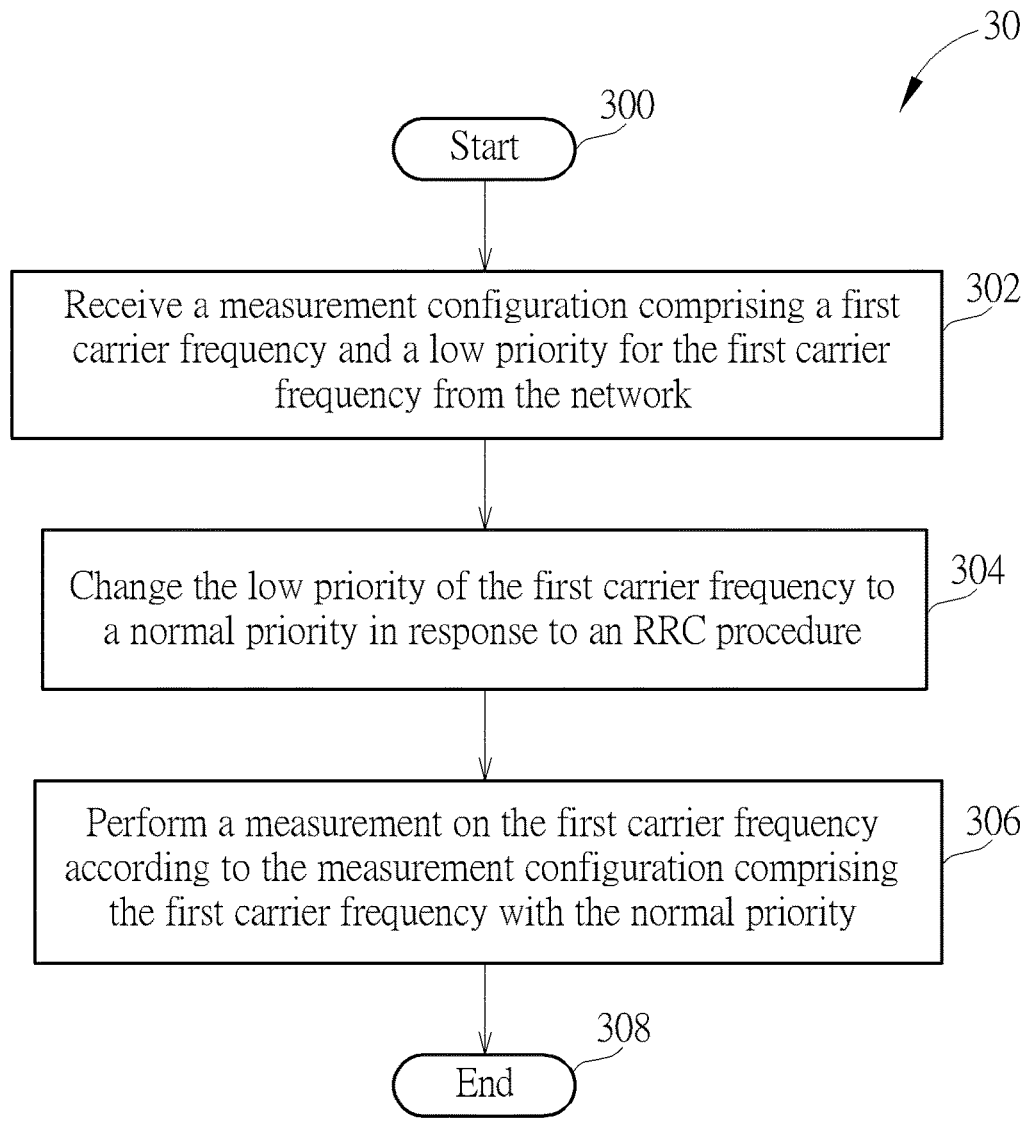
FIG. 3 is a flowchart of a process according to an example of the present invention.

FIG. 3 is a flowchart of a process 30 according to an example of the present invention. The process 30 may be utilized in a communication device shown in FIG. 1, to handle a measurement configuration. The process 30 may be compiled into the program code 214 and includes the following steps:

Step 300: Start.

Step 302: Receive a measurement configuration comprising a first carrier frequency and a low priority for the first carrier frequency from the network.

Step 304: Change the low priority of the first carrier frequency to a normal priority in response to a radio resource control (RRC) procedure.

Step 306: Perform a measurement on the first carrier frequency according to the measurement configuration comprising the first carrier frequency with the normal priority.

Step 308: End.

According to the process 30, the communication device receives a measurement configuration comprising a first carrier frequency and a low priority (e.g., low measurement performance) for the first carrier frequency from the network (e.g., a serving eNB). The communication device performs measurement(s) on the first carrier frequency according to the measurement configuration with the low priority. The communication device changes the low priority of the first carrier frequency to a normal priority (e.g., normal measurement performance) in response to an RRC procedure. Then, the communication device performs a measurement on the first carrier frequency according to the measurement configuration comprising the first carrier frequency with the normal priority. In other words, in certain situations, the communication device may receive a measurement configuration conforming to the 3GPP standard of a new version via a broadcast message or a dedicated message from a first eNB (e.g., a source eNB) of the network, and the first eNB can configure a normal priority of a carrier frequency to a low priority. However, a second eNB (e.g., a target eNB) of the network may not conform to the 3GPP standard of the new version. For example, the second eNB cannot recognize the "low priority" configured to the carrier frequency. The second eNB cannot regularly perform a radio resource management to communicate with the communication device, if the measurement configuration is transmitted from the first eNB to the second eNB (e.g., for a handover) and/or the communication device transmits a measurement result obtained according to the measurement configuration to the second eNB. According to the process 30, the priority of the carrier frequency is configured as the normal priority recognized by most eNBs in response to the RRC procedure. The problem that the communication device is not able to communicate with the eNBs with the 3GPP standard of former versions (i.e., legacy 3GPP standards) is solved.

It should be noted that a carrier frequency configured with a low priority means that the communication device performs measurements less frequently on the carrier frequency compared to another carrier frequency configured a normal priority.

Realization of the present invention is not limited to the above description.

In one example, the RRC procedure may be used for configuring the communication device to receive one or more transmissions (e.g., data, physical DL shared channel (PDSCH), or physical DL control channel (PDCCH)) on the first carrier frequency. In detail, the communication device may change the low priority of the first carrier frequency to the normal priority, when the communication device is configured by the RRC procedure to receive transmission(s) on the first carrier frequency from an eNB. That is, the communication device may perform measurement(s) with normal measurement performance as specified by the 3GPP standard instead of low or reduced measurement performance as specified by the 3GPP standard. The communication device measuring the first carrier frequency with the low or reduced measurement performance means that the communication device measuring the first carrier frequency less frequently than the communication device measuring the first carrier frequency with the normal measurement performance. In one example, the RRC procedure may include an RRC connection re-establishment procedure toward to another eNB. In one example, the RRC procedure may include a handover. In detail, the communication device may prepare to hand over from a source eNB to a target eNB, wherein the target eNB cannot recognize the low priority configured to the first carrier frequency. Thus, the communication device may change the low priority of the first carrier frequency to the normal priority in response to the handover. In one example, an RRC message transmitted by the network in an RRC procedure may not include a priority signaling changing a priority of the first carrier frequency.

A method according to which the communication device changes the low priority of the first carrier frequency is not limited. In one example, the communication device may change the low priority of the first carrier frequency to the normal priority according to a priority signaling transmitted by the network. That is, the network may indicate the communication device to change the low priority of the first carrier frequency. For example, the priority signaling may be transmitted in an RRCConnectionReconfiguration message for triggering a handover, or may be transmitted in the first RRCConnectionReconfiguration message following an RRC connection re-establishment procedure.

Moreover, the RRC procedure in the process 30 may not involve any eNB change. In one example, the RRC procedure may include an RRCConnectionReconfiguration procedure which configures a secondary cell (SCell) on the first carrier frequency. In this case, the communication device connects to a primary cell (PCell) of an eNB and receives an RRCConnectionReconfiguration message configuring the SCell from the PCell of the eNB. In another example, the RRC procedure may include an RRC connection re-establishment procedure toward to a same eNB to which the communication device connected before the RRC connection re-establishment procedure. In one example, an RRC message transmitted by the network in the RRC procedure may not include a priority signaling changing a priority of the first carrier frequency.

In addition, the communication device may change the normal priority of the first carrier frequency back to the low priority, when the measurement configuration is released. In one example, the communication device may change the normal priority of the first carrier frequency back to the low priority, when the communication device is not configured to receive transmission(s) on the first carrier frequency, e.g., due to a handover, an RRC connection re-establishment to another carrier frequency, or a release of a SCell on the first carrier frequency.

In one example, the communication device in the process 30 may change the normal priority of a second carrier frequency to the low priority, when the low priority of the first carrier frequency is changed to the normal priority. In detail, a number of carrier frequencies with the normal priority may greater than a predetermined limit, when the low priority of the first carrier frequency is changed to the normal priority. Accordingly, the number of carrier frequencies with the normal priority is greater than that the communication device is able to measure with normal measurement performance as defined by the 3GPP standard. Thus, the communication device may change the normal priority of the second carrier frequency to the low priority, to keep the number of carrier frequencies not greater than the predetermined limit. The problem is thus avoided. In one example, the second carrier frequency may be a SCC, before the first carrier frequency is configured as a SCC. That is, the second carrier frequency is removed from a configured CC set and the first carrier frequency is added to the configured CC set as a SCC. In one example, the second carrier frequency may be a PCC, before a handover or an RRC connection re-establishment procedure is performed. The above examples may be referred as a priority swapping due to a connected carrier frequency swapping or a SCC replacement (i.e. releasing a SCC while adding another SCC). The network may transmit an RRC message (e.g. RRCConnectionReconfiguration) to configure the communication device to perform the SCC replacement.

In addition, an eNB may consider a priority of the first carrier frequency in the measurement configuration as a normal priority in response to a handover, an RRC connection re-establishment procedure or a configuration of a SCell on the first carrier frequency. The eNB may change a priority of the second carrier frequency as a low priority in response to the handover, the RRC connection re-establishment procedure or the SCC replacement. A message transmitted by the eNB in the handover or the RRC connection re-establishment procedure may or may not include the priority signaling. A message transmitted by the eNB for a configuration of the SCell on the first carrier frequency or for the SCC replacement may or may not include the priority signaling.

Figure 4:
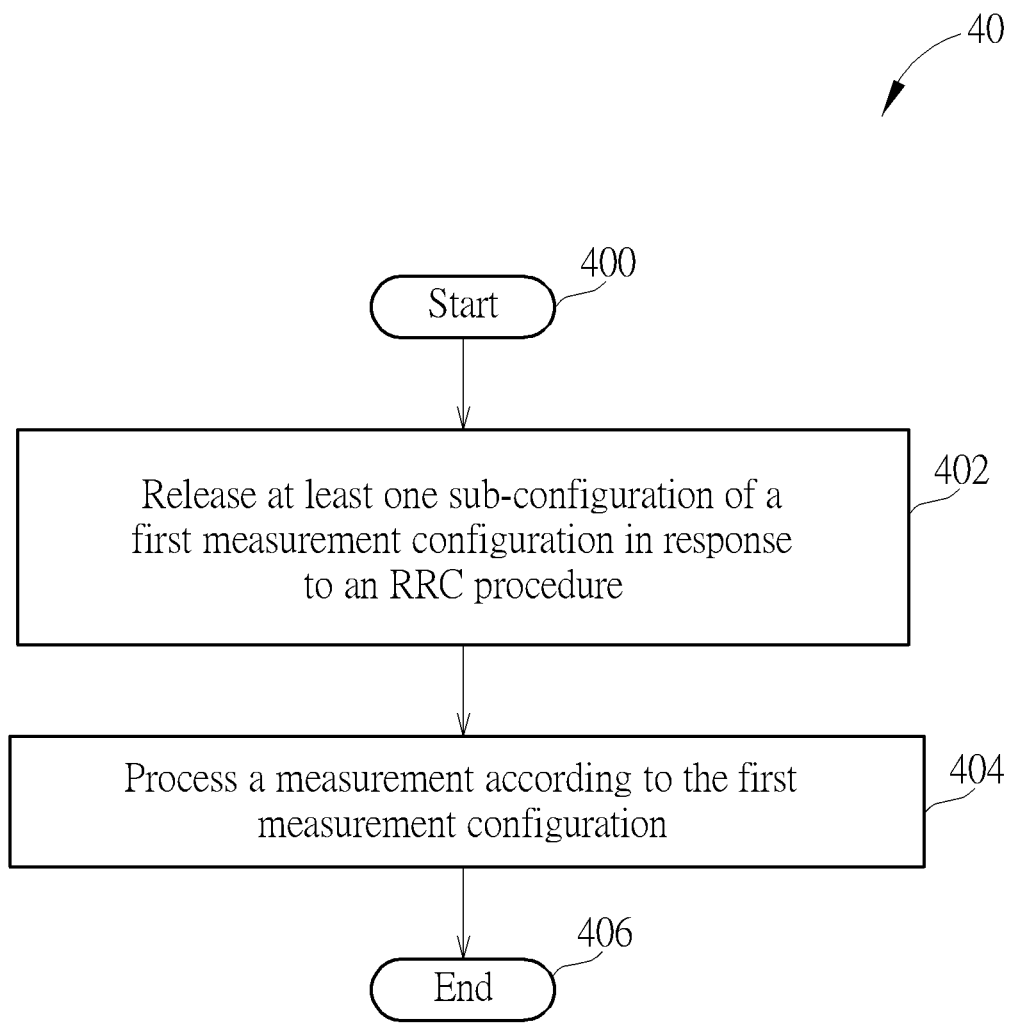
FIG. 4 is a flowchart of a process according to an example of the present invention.

FIG. 4 is a flowchart of a process 40 according to an example of the present invention. The process 40 may be utilized in a communication device and/or the network shown in FIG. 1, to handle a measurement configuration. The process 40 may be compiled into the program code 214 and includes the following steps:

Step 400: Start.

Step 402: Release at least one sub-configuration of a first measurement configuration in response to an RRC procedure.

Step 404: Process a measurement according to the first measurement configuration.

Step 406: End.

According to the process 40, the communication device and/or the network may release at least one sub-configuration of a first measurement configuration in response to an RRC procedure, and may process a measurement according to the first measurement configuration. In other words, in certain situations, the communication device may receive a measurement configuration conforming to the 3GPP standard of a new version from a first eNB (e.g., a source eNB) of the network. However, a second eNB (e.g., a target eNB) of the network may not conform to the 3GPP standard of the new version. For example, the second eNB cannot recognize sub-configuration(s) of the new version which may include measId, carrierFreq, eventId, widebandRSRQ-Meas-r11, etc. In other words, the second eNB does not recognize a wideband reference signal received quality (RSRQ) measurement result, a new carrierFreq, an extended measId or a new eventId. The second eNB cannot correctly perform a radio resource management to communicate with the communication device, if the measurement configuration is transmitted from the first eNB to the second eNB (e.g., for a handover) and/or the communication device transmits a measurement result obtained according to the measurement configuration to the second eNB. According to the process 40, one or more sub-configurations configured according to the 3GPP standard of the new version are released by the communication device, the first eNB and/or the second eNB. For the communication device, processing the measurement according to the measurement configuration may include performing measurement(s) or reporting a measurement result according to the measurement configuration. For the second eNB, processing the measurement according to the measurement configuration may include receiving the measurement result according to the measurement configuration. The problem that the communication device is not able to communicate with the eNBs with the 3GPP standard of former versions (i.e., legacy 3GPP standards) is solved.

Realization of the present invention is not limited to the above description.

In one example, the RRC procedure may be used for configuring the communication device to receive one or more transmissions on a carrier frequency. In one example, the RRC procedure may include an RRC connection re-establishment procedure. In one example, the RRC procedure may include a handover. In detail, the communication device may prepare to hand over from a source eNB to a target eNB, wherein the target eNB cannot recognize a sub-configuration configured according to the 3GPP standard of the new version. Thus, the communication device may release one or more sub-configurations configured according to the 3GPP standard of the new version. Then, the communication device may not apply the one or more sub-configurations for measurement(s), after releasing the one or more sub-configurations.

Step 404 may be performed in various ways according to where the step is realized. In one example, the communication device may perform the measurement according to the first measurement configuration. Correspondingly, the network (e.g., an eNB) may receive a measurement result of the measurement according to the first measurement configuration.

According to the above description, an example is illustrated as follows. A communication device in an RRC connected mode receives a measurement configuration for a carrier frequency, wherein the measurement configuration may include a plurality of sub-configurations (e.g., measId, carrierFreq, eventId, widebandRSRQ-Meas-r11). The communication device may perform an RRC connection re-establishment procedure due to a cause (e.g., a radio link failure (RLF)) defined in the 3GPP standard. In response to the RRC connection re-establishment procedure, the communication device may release a sub-configuration of the plurality of sub-configurations (e.g., widebandRSRQ-Meas-r11). In other words, the communication device does not apply the sub-configuration, after performing the RRC connection re-establishment procedure. An eNB may receive an RRCConnectionReestablishmentRequest from the communication device. The eNB may also release the sub-configuration (e.g., wideband RSRQ measurement configuration, i.e., widebandRSRQ-Meas-r11). The eNB may be an eNB (e.g., source eNB) which configures the measurement configuration to the communication device, or may be an eNB (e.g., target eNB) which receives the measurement configuration from another eNB which configures the measurement configuration to the communication device. In other words, the eNB does not expect that the communication device is configured with the released sub-configuration in response to the RRC connection re-establishment procedure. The eNB needs to configure the released sub-configuration to the communication device after performing the RRC connection re-establishment procedure, e.g. by transmitting an RRC-ConnectionReconfiguration message to the communication device, if the eNB needs the communication device to apply the released sub-configuration.

It should be noted that a released sub-configuration may be any sub-configuration configured in MeasConfig defined later than 3GPP standard Rel-8, Rel-9, Rel-10 or Rel-11. For example, the at least one sub-configuration in the process 40 may include t312-r12 (Rel-12), carrierMeasurementPriority-r12 (Rel-12) or altTTT-CellsToAddModList-r12 (Rel-12), alternativeTimeToTrigger-r12 (Rel-12), measCycleSCell-r10 (Rel-10) or measSubframePatternConfigNeigh-r10 (Rel-10).

Furthermore, the at least one sub-configuration in the process 40 may include all sub-configurations of the first measurement configuration. That is, the communication device and/or the network may release all sub-configurations of the first measurement configuration, because one of the at least one sub-configuration may not be supported by the target eNB. Consequently, it results that the communication device and/or the network may release the first measurement configuration directly.

In addition, the communication device and/or the network may determine to release or keep a measurement configuration according to certain conditions. In one example, the communication device and/or the network may determine to release the first measurement configuration when the first measurement configuration includes a first measurement identity greater than 32 and keep a second measurement configuration when the second measurement configuration includes a second measurement identity smaller than 33. The communication device and/or the network may process another measurement according to the second measurement configuration. In one example, the communication device and/or the network may release the first measurement configuration, but the communication device and/or the network may keep a second measurement configuration and process another measurement according to the second measurement configuration, wherein the first measurement configuration may include a first measurement identity greater than 32, and the second measurement configuration may include a second measurement identity smaller than 33. In one example, the at least one sub-configuration may include a low priority for the measurement on a carrier frequency, a measurement identity greater than 32, or a wideband RSRQ measurement configuration.

According to the above description, an example is illustrated as follows. A communication device in an RRC connected mode receives a measurement configuration for a carrier frequency, wherein the measurement configuration may include a measurement identity greater than 32 (e.g., a new IE measId-v12xy is included in the measurement configuration), or may include a carrier frequency with a low priority (e.g., the carrier frequency belongs to a low measurement performance group). The communication device may perform an RRC connection re-establishment procedure due to a cause (e.g., an RLF) defined in the 3GPP standard. In response to the RRC connection re-establishment procedure, the communication device may release the measurement configuration. In other words, the communication device does not apply the measurement configuration in response to the RRC connection re-establishment procedure. An eNB receiving an RRCConnectionReestablishmentRequest from the communication device may also release the measurement configuration. The eNB may be an eNB (e.g., source eNB) which configures the measurement configuration to the communication device, or may be an eNB (e.g., target eNB) which receives the measurement configuration from another eNB which configures the measurement configuration to the communication device. In other words, the eNB does not expect that the communication device is configured with the measurement configuration in response to the RRC connection re-establishment procedure. The eNB needs to configure the measurement configuration after performing the RRC connection re-establishment procedure, e.g. by transmitting an RRCConnectionReconfiguration message to the communication device, if the eNB needs the communication device to apply the measurement configuration.

It should be noted that the communication device may store another measurement configuration including another measurement identity (e.g. the original IE measId) smaller than 33. In response to the RRC connection re-establishment procedure, the communication device may keep the other measurement configuration. Correspondingly, the eNB may store the other measurement configuration, e.g., in response to the RRC connection re-establishment procedure.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SIP), a computer on module (COM), and the communication device 20.

To sum up, the present invention provides a method for handling a measurement configuration. According to the present invention, a communication device and an eNB are able to communicate with each other via the measurement configuration including recognizable sub-configurations(s) and/or parameter(s). Thus, the problem that eNBs conforming to the 3GPP standards of various versions coexisting in the same network is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a measurement configuration, comprising:
   a data storage device for storing instructions of:
   receiving a measurement configuration comprising a first carrier frequency and a low priority for the first carrier frequency from a network;
   changing the low priority of the first carrier frequency to a normal priority in response to a radio resource control (RRC) procedure; and
   performing a measurement on the first carrier frequency according to the measurement configuration comprising the first carrier frequency with the normal priority; and
   a processing means, coupled to the storage unit, configured to execute the instructions stored in the storage device.

2. The communication device of claim 1, wherein the RRC procedure is for configuring the communication device to receive at least one transmission on the first carrier frequency.

3. The communication device of claim 1, wherein the RRC procedure comprises an RRC connection re-establishment procedure or a handover.

4. The communication device of claim 1, wherein the instructions further comprises:
   changing the normal priority of the first carrier frequency back to the low priority, when the measurement configuration is released.

5. The communication device of claim 1, wherein the instructions further comprises:
   changing the normal priority of the first carrier frequency back to the low priority, when the communication device is not configured to receive a transmission on the first carrier frequency.

6. The communication device of claim 1, wherein the instructions further comprises:
   changing the normal priority of a second carrier frequency to the low priority, when the low priority of the first carrier frequency is changed to the normal priority.

7. A communication device for handling a measurement configuration, comprising:
   a data storage device for storing instructions of:
   releasing at least one sub-configuration of a first measurement configuration in response to a radio resource control (RRC) procedure; and
   processing a measurement according to the first measurement configuration;
   wherein the at least one sub-configuration is comprised in a MeasConfig defined later than a 3rd Generation Partnership Project (3GPP) standard Rel-8, Rel-9, Rel-10 or Rel-11; and
   a processing means, coupled to the storage device, configured to execute the instructions stored in the storage device.

8. The communication device of claim 7, wherein the RRC procedure is for configuring the communication device to receive at least one transmission on the first carrier frequency.

9. The communication device of claim 7, wherein the RRC procedure comprises an RRC connection re-establishment procedure or a handover.

10. The communication device of claim 7, wherein the instruction of processing the measurement according to the first measurement configuration further comprises:
    performing the measurement according to the first measurement configuration.

11. The communication device of claim 7, wherein the instruction of processing the measurement according to the first measurement configuration further comprises:
receiving a measurement result of the measurement according to the first measurement configuration.

12. The communication device of claim 7, wherein the at least one sub-configuration comprises all sub-configurations of the first measurement configuration.

13. The communication device of claim 7, wherein the instruction of processing the measurement according to the measurement configuration further comprises:
releasing the first measurement configuration;
keeping a second measurement configuration; and
processing another measurement according to the second measurement configuration;
wherein the first measurement configuration comprises a first measurement identity greater than 32, and the second measurement configuration comprises a second measurement identity smaller than 33.

14. A communication device for handling a measurement configuration, comprising:
a data storage device for storing instructions of:
releasing at least one sub-configuration of a first measurement configuration in response to a radio resource control (RRC) procedure; and
processing a measurement according to the first measurement configuration;
wherein the at least one sub-configuration comprises a low priority for the measurement on a carrier frequency, a measurement identity greater than 32, and a wideband reference signal received quality (RSRQ) measurement configuration; and
a processing means, coupled to the storage device, configured to execute the instructions stored in the storage device.

* * * * *